Aug. 22, 1967  N. W. F. PHILLIPS ET AL  3,336,731
PROCEDURES FOR TREATING GASEOUS ALUMINUM HALIDE
Filed May 17, 1965
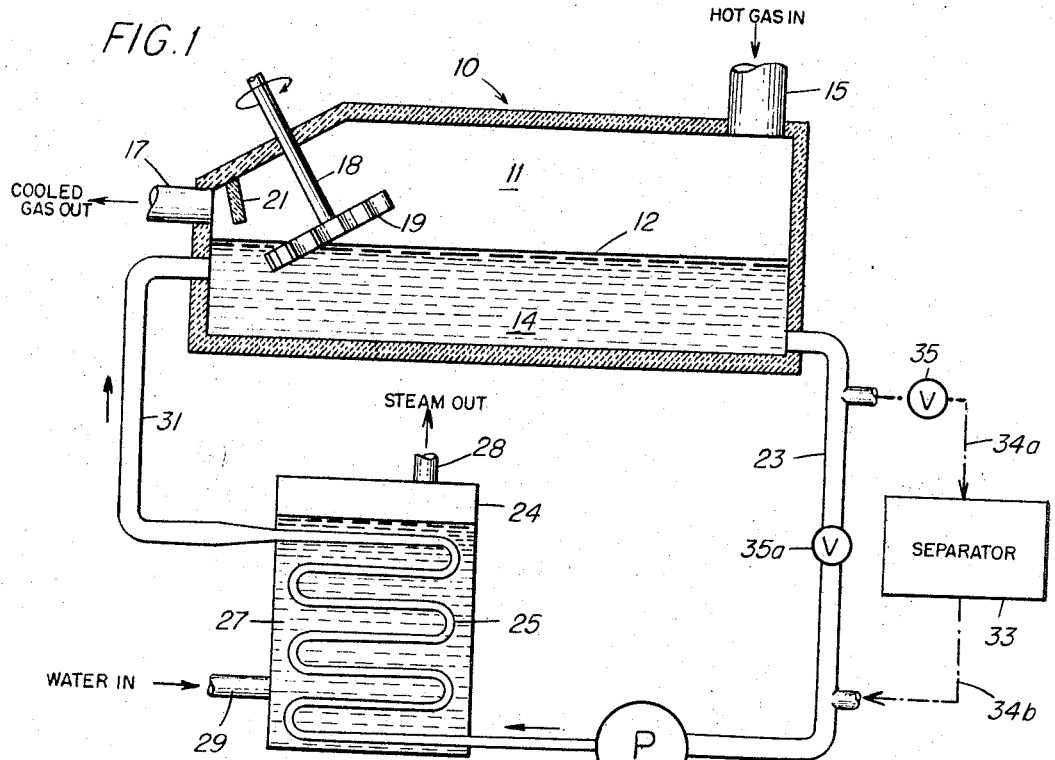
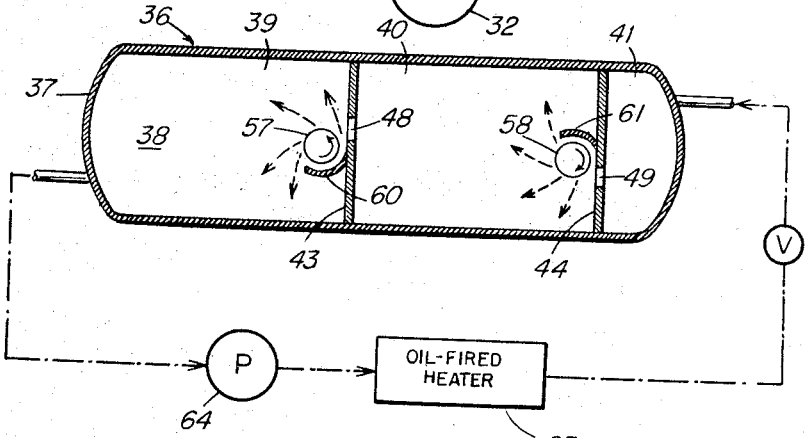
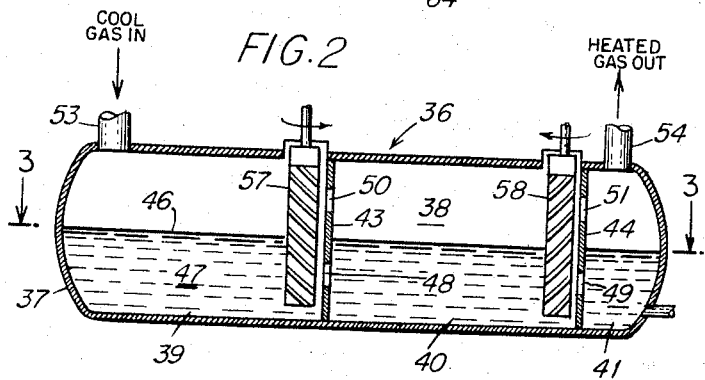
Inventors
Norman W. F. Phillips
Frederick William Southan
By Robert S. Dunham
Attorney 3,336,731
PROCEDURES FOR TREATING GASEOUS ALUMINUM HALIDE
Norman W. F. Phillips and Frederick William Southam, Arvida, Quebec, Canada, assignors to Aluminium Laboratories Limited, Montreal, Quebec, Canada, a corporation of Canada
Filed May 17, 1965, Ser. No. 456,265
10 Claims. (Cl. 55—71)

This invention relates to procedures for effecting physical treatment of gaseous aluminum halide while maintaining the halide under treatment in gaseous state, and more particularly to procedures for heating or cooling and/or scrubbing a flow of aluminum halide gas as in a so-called aluminum subhalide distillation system.

The production of purified aluminum metal from crude aluminum-containing alloys by subhalide (e.g. monochloride) distillation as disclosed for example in United States Patent No. 2,937,082, involves reaction of the alloy with gaseous aluminum normal halide (e.g. aluminum trichloride, $AlCl_3$) at elevated temperature. Thus, in an illustrative example of such operation, a mass of granules or particles of the alloy is exposed to a continuous flow of aluminum trichloride gas in a suitable converter or furnace at a temperature ordinarily in excess of 1000° C. Aluminum in the alloy reacts with some of the trichloride gas in the converter to form aluminum monochloride gas (i.e. $AlCl$). This monochloride gas, usually mixed with unreacted trichloride, is conducted from the converter to a decomposing region where it is reduced in temperature and thereby caused to decompose or disassociate into reconstituted aluminum trichloride gas and the desired purified product aluminum metal. Gas consisting essentially of aluminum trichloride is discharged from the decomposer, e.g. at a temperature of about 700° C.; for the sake of convenience and economy of operation this latter gas is, in accordance with conventionally proposed procedures, recycled to the converter for re-use therein.

Continuous circulation of aluminum trichloride from the decomposer to the converter may be accomplished in a variety of ways. For instance, the trichloride may be maintained continuously in gaseous state and advanced through a conduit system by means of a suitable mechanical gas circulator or pumping means. Alternatively, the aluminum trichloride discharged from the decomposer may be condensed by cooling, either to solid state or to a liquid phase (conveniently in a molten mixture of aluminum trichloride and other chloride salt or salts), and subsequently re-evaporated by heating for return as a gas to the converter. The condensation and re-evaporation procedure can itself serve to effectuate the circulation of the trichloride from the decomposer to the converter, and has a further important function in providing purification of the gas flow. In this connection it may be explained that the trichloride gas as discharged from the decomposer ordinarily contains gaseous impurities such as hydrogen, produced in the system, which tend to build up as the gas is repeatedly circulated through the system, impairing the efficiency of the distillation operation. The steps of condensation of the trichloride followed by re-evaporation facilitate prevention or control of accumulation of these impurities in the gas stream, in that as the aluminum trichloride condenses the impurities remain in gaseous state and thus may readily be separated from the trichloride and driven off. Effective control of the level of gaseous contamination of the trichloride flow may in many instances only necessitate treatment of a minor portion of the flow; when only part of the trichloride flow is subjected to condensation and re-evaporation, the remainder of the trichloride gas may be returned directly to the converter, i.e. in maintained gaseous state, by mechanical circulating means as mentioned above.

In circulation of the trichloride gas as by any of the above-described operations, the temperature of the trichloride gas returned for re-use in the converter (whether directly as gas discharged from the decomposer or after condensation and re-evaporation) is commonly several hundred degrees lower than the temperature (e.g. upwards of 1000° C.) at which it is desired to reintroduce the gas to the converter; accordingly, the gas is ordinarily preheated immediately upstream of the converter gas inlet to the selected inlet temperature, for example by directing the flow of gas through an electrically heated bed of carbonaceous material.

Apart from the condensation and re-evaporation operations and preheating of the converter inlet gas as mentioned above, it is frequently desirable to heat or cool the circulating flow of aluminum trichloride, as a gas, between first and second (higher or lower) temperatures e.g. within a range of about 150° C. to 700° C. or higher, at one or more localities in the path of circulation of the gas flow, while maintaining the trichloride continuously in gaseous state and without augmenting or diminishing the flow of gas. By way of specific illustration, when a mechanical circulator is used to recirculate the trichloride gas discharged from the decomposer, it may be desired to cool the gas to some extent (for example from the decomposer exit temperature of e.g. about 700° C. down to about 600° C.) before advancing the gas through the circulating apparatus, to mitigate the severity of the operating conditions to which the circulator is exposed. Again, when the trichloride gas is condensed as to solid state in a mechanical condenser, it may be advantageous to precool the gas from the decomposer exit temperature to a temperature in a range between about 200° and about 300° C. before introducing the gas to the condenser. As a further example, after re-evaporation of condensed aluminum trichloride from finely divided solid form as in a flash evaporation operation, it may be advantageous to heat the gas preliminarily to an intermediate temperature, before bringing the gas up to the converter inlet temperature by preheating procedure as referred to above.

Conventional equipment suitable for thus heating and cooling aluminum trichloride gas is ordinarily large in size and tends to be troublesome in operation, especially if there is present in the gas flow any particulate solid or other entrained aerosol material which would deposit on heat transfer surfaces and interfere with efficiency of heat transfer (the term "aerosol material" being employed herein broadly to refer to any liquid droplets or solid particles carried in the gas flow). The removal of such aerosol material itself represents a further desired physical treatment of the gas flow in various instances even when no alteration of the gas tempertaure is required; again, it is desirable to effectuate such aerosol removal while maintaining the trichloride in gaseous state (i.e. without diminishing or augmenting the gas flow). As one example, the aluminum trichloride gas discharged from the decomposer may carry entrained droplets of aluminum metal, i.e. aluminum fog, produced in the decomposer; before the gas is advanced through apparatus such as a mechanical circulator, these droplets should be removed to protect the circulator apparatus from contact with the corrosive molten aluminum.

An object of the present invention is to provide procedures for physically treating a flow of aluminum normal halide gas while maintaining the aluminum halide continuously in gaseous state, such procedures being particularly adapted to effect heating or cooling and/or scrubbing of a flow of the gas in a facile, convenient and efficient manner. Another object is to provide procedures for heating or cooling a flow of aluminum normal halide gas, wherein efficiency of heat transfer is not impaired by the presence of entrained solids or liquid droplets in the gas flow, and which afford concomitant removal of such aerosol material, when present, from the flow of gas under treatment. A further object is to provide new and effective procedures for scrubbing a flow of aluminum normal halide gas to effect removal of entrained aerosol material therefrom.

To these and other ends, the method of the invention broadly contemplates effecting physical treatment of a flow of gas consisting essentially of aluminum normal halide by advancing the gas flow through a confined region while maintaining the normal halide continuously in gaseous state, and in the confined region bringing the flow of gas into direct surface contact with a molten salt which is substantially non-volatile and non-absorbtive to the aluminum normal halide gas under the conditions of pressure and temperature obtaining in the confined region, i.e. so that the passage of gas through the confined region is effected essentially without diminution or augmentation of the gas flow.

In use of the present method to heat or cool the flow of aluminum halide gas, the molten salt is maintained at a temperature for altering the gas temperature from a first value, at which the gas enters the confined region, to a second, desired (higher or lower) temperature. The extended surface contact of the gas and molten salt effects heat exchange between the gas and salt in the confined region whereby the gas is cooled or heated to the desired temperature. For maintenance of the molten salt at the desired temperature, the molten salt is transferred between the locality of gas-salt contact in the confined region and a second locality (either within or outside the confined region) where it is heated or cooled; such heating or cooling of the salt may be accomplished, for example, by circulating the molten salt from the confined region through external heating or cooling means or by providing appropriate cooling means such as heating or cooling coils in contact with a body of the molten salt in the confined region. When an electrically conductive molten salt is used for heating aluminum halide gas, the salt may be maintained at the requisite temperature by direct electrical resistance heating, i.e. by passing electric current through the salt melt.

The described procedure affords efficient heating or cooling of the gas between first and second temperature values e.g. in a range of about 150° C. to about 700° C. or higher. With respect to this exemplary range of temperatures, it may be noted that although 150° C. is below the condensation point of aluminum normal halides at atmospheric pressure, nevertheless at pressures below atmospheric the aluminum normal halide may be in gaseous state at the latter temperature; the method of the present invention embraces operation at such sub-atmospheric pressure and thus includes operation under conditions in which the normal halide is a gas at temperatures as low as 150° C.

In the foregoing heat exchange procedure any particulate solid or liquid entrained in the gas flow is scrubbed out by the contact of molten salt with the gas without impairing the efficiency of heat transfer and with the further advantageous result that the gas as discharged from the confined region is essentially free of such aerosol material. The molten salt, containing the particles (e.g. solid) removed from the gas, may be circulated from the locality of gas-liquid contact in the confined region to a second locality and there passed through appropriate filter means which remove the particles so as to prevent excessive accumulation of particles in the molten salt. When aluminum fog i.e. in liquid state is present in the gas and removed by the molten salt, the salt containing the aluminum fog droplets may be circulated to a settling chamber where the aluminum and salt are permitted to separate, the specific gravity of the molten salt being different from that of molten aluminum; the separated salt is then returned for re-use to treat the gas flow in the confined region.

The present method may also be employed to effect scrubbing of the flow of gas without altering the temperature of the gas flow. In such case, as in the above-described procedure, the solid or liquid material entrained in the gas is removed from the gas and transferred to the molten salt by the step of bringing the gas and salt into extended surface contact in the confined region; and the salt containing this material is circulated from the gas-salt contact locality in the confined region to a second locality where such material is separated from the salt. However, as there is no need to heat or cool the molten salt, the temperature of the salt may, in this instance be the same as the temperature at which the gas flow enters the confined region.

In a broad sense, the gas-liquid contact step of the present method may be affected in any suitable manner providing thorough, intimate contact between the gas and molten salt, for example in a conventional gas-liquid contact device such as a splash condenser wherein a body of the molten salt is splashed or sprayed through the path of the gas flow, or a packed tower through which the gas and salt are passed in countercurrent flow; or such contact may be effected simply by bubbling the gas through a layer of the molten salt. For operation wherein a particulate solid is present in the gas stream, use of a splash condenser is preferred for effecting the gas-liquid contact.

It will be understood that the term "splash condenser" is employed herein as a conventional designation for the described type of gas-liquid contact apparatus, although in fact in the present method such apparatus is not used for a condensing function, as will be apparent below. That is to say, no condensing action occurs in continuing operation of the present process, i.e. no removal or diminution of gas by conversion to non-gaseous state, the splash condenser (or other contact apparatus) employed therein being used, as stated, simply to effect extended surface contact between the molten salt and the gas flow.

The molten salt employed in the present method should, as stated, be substantially non-volatile and non-absorptive to the aluminum normal halide in the confined region, so that the flow of gas is not contaminated, or augmented or diminished, during passage through the latter region and so that the normal halide is maintained continuously in gaseous state therein. A variety of inorganic molten salts are suitable for this purpose, possessing the requisite stability under the contemplated operating conditions. As a particular feature of the invention, it is presently especially preferred to use a molten salt containing a substantial proportion of the aluminum normal halide which constitutes the gas flow, i.e. a molten mixture of the aluminum halide and one or more other salts. The salt or salts (other than aluminum halide) used in such mixture are selected to be non-volatile and to form stable molten mixtures with aluminum normal halide at the contemplated temperatures of operation. For example, the molten salt may be a mixture of the aluminum normal halide and one or more alkali metal halides or alkaline earth metal halides of the same halogen as the aluminum halide, reference to alkaline earth metals herein being understood to include magnesium as well as calcium and the metals specifically classed with calcium in this category of the Periodic Table. Thus, for instance, for treatment of aluminum trichloride gas the molten salt may conveniently comprise a mixture of aluminum trichloride and one or more alkali metal chlorides or alkaline earth metal chlorides, e.g. a mixture of aluminum trichloride and sodium chloride or of aluminum trichloride and potassium chloride.

In this connection it may be explained that whereas aluminum trichloride alone sublimes at a temperature of about 178° C. and boils (under conditions of elevated pressure) at temperatures below 200° C., nevertheless aluminum trichloride (as also other aluminum normal halide, e.g. aluminum tribromide) forms stable molten mixtures with other salts such as sodium chloride at temperatures up to 700° C. or even higher. The proportion of aluminum trichloride present in such mixture (e.g. a mixture with sodium chloride) is dependent on the conditions of pressure and temperature to which it is exposed. In general, at a given pressure, the trichloride content of such molten mixture decreases with increasing temperature; at any given temperature the mixture will come to equilibrium with an aluminum trichloride atmosphere, by condensation of trichloride in the mixture or evaporation of trichloride from the mixture, and thereafter with maintenance of constant conditions, the mixture will be effectively saturated with aluminum trichloride and essentially no further volatilization or absorption of trichloride will occur.

Thus, when a molten salt mixture containing aluminum normal halide is used in the method of the invention for treating a flow of the normal halide gas, the mixture rapidly adjusts to equilibrium composition in the confined region, by initial evaporation of aluminum normal halide from the molten mixture or absorption of aluminum normal halide into the molten mixture from the gas stream. Thereafter, if pressure or temperature conditions change in the confined region, there may be further temporary evaporation or absorption of the normal halide to the extent necessary to bring the mixture composition again to equilibrium, i.e. under the changed conditions; but there is no loss of normal halide from the gas stream, or addition of gas thereto from the molten mixture, in any progressive or continuing sense, since the molten mixture in the confined region is maintained in equilibrium with the aluminum normal halide atmosphere therein, being effectively saturated with the normal halide. When the mixture is circulated from the confined region as through an external heat-exchanger or through means for separating out material scrubbed from the gas flow, the mixture in the external circulating path is maintained under conditions such that there is no addition of aluminum normal halide to, or loss of normal halide from, the mixture at any point outside the confined gas flow-treating region, and hence the molten mixture returned to the confined region has the same proportionate content of normal halide as that withdrawn from the confined region.

In this way the desired treatment of the gas flow is effected, without contamination of the flow (since the constituents of the molten mixture are non-volatile) and while the gaseous normal halide constituting the flow is maintained continuously in gaseous state; because the molten mixture is in equilibrium condition, there is no diminution of the gas flow by condensation or absorption of normal halide therefrom, or augmentation of the flow by evaporation of normal halide from the molten mixture.

Further features and advantages of the invention will be apparent from the detailed description hereinbelow set forth together with the accompanying drawings, wherein:

FIG. 1 is a schematic view of one form of apparatus suitable for performance of the present method to effect cooling of a flow of aluminum normal halide gas;

FIG. 2 is a schematic sectional elevational view of apparatus suitable for performing the present method to heat a flow of aluminum halide gas; and FIG. 3 is a schematic sectional plan view of the apparatus of FIG. 2, taken along the line 3—3 of FIG. 2.

Referring first to FIG. 1, the apparatus there shown includes a splash condenser 10 e.g. of conventional character, having an enclosed chamber 11 which is adapted to be partly filled, i.e. to a level 12, with a body of molten salt 14. The walls of the chamber 11 are fabricated of suitable material, e.g. refractory material, resistant to deterioration under the conditions of operation. In this condenser, aluminum normal halide gas to be treated is directed into chamber 11 through a gas inlet 15 opening downwardly into the top of the chamber at one side thereof, and the treated gas is discharged from the chamber through a gas outlet 17 opening through a side wall of the chamber at a locality substantially separated from the inlet 15, so that the gas flow traverses the upper portion of the chamber 11 above the level of the molten salt therein.

A rotary impeller 18 driven by suitable means (not shown) extends downwardly from the top of the condenser 10 into the chamber 11 adjacent the gas outlet 17, the blade 19 of the impeller being partially immersed in the molten salt body 14. This impeller is arranged and disposed so that when rotated it splashes or sprays the molten salt from the body 14 through the upper portion of the chamber 11, i.e. in the path of advance of the normal halide gas through the chamber, thereby to effect thorough, intimate contact between the flow of gas and the molten salt in such upper chamber portion. A baffle 21, e.g. fabricated of suitably resistant refractory material, projects downwardly from the roof of the condenser 10 to a locality slightly above the molten salt level 12 at a point intermediate the impeller 18 and the gas outlet 17.

From the chamber 11, molten salt is conducted for cooling through an outlet conduit 23 to an external heat exchanger 24 where the molten salt passes through a coil 25 which is immersed in a body of water 27. Passage of the molten salt through the coil effects transfer of heat from the molten salt to the water, which boils in heat exchanger 24, steam being released through an outlet 28 and additional water being supplied as necessary to the heat exchanger through inlet 29. The cooled molten salt is returned to the chamber 11 through a further conduit 31, being advanced through this external conduit and heat exchanger system by means of a pump represented at 32. The heat exchanger shown is satisfactory for temperatures of operation below about 500° C.; for operation at higher temperatures, however, it is presently preferred to use a heat exchanger employing natural or forced air circulation over the cooling coil through which the molten salt passes.

In carrying forward the method of the present invention with the apparatus of FIG. 1, for example to cool a flow of aluminum trichloride gas by heat exchange with a molten mixture of aluminum trichloride and sodium chloride, the molten mixture is first prepared, with relative proportions of the constituent salts approximately corresponding to equilibrium composition for the contemplated temperature and pressure of operation, and introduced to the chamber 11. The flow of gas to be cooled (i.e. a flow of heated gas consisting essentially of aluminum trichloride, for instance as discharged from the decomposer of an aluminum subhalide distillation system) is then advanced through the chamber 11, as a continuous gas flow, while the impeller 18 is continuously rotated to splash the molten salt through the path of advance of the gas so that the gas and salt are brought into extended heat-exchange contact. The molten mixture is maintained at the requisite temperature for cooling the gas flow by circulating the molten mixture from the chamber 11 through the coil 25 of the heat exchanger and back to the chamber.

At the start of such operation, the molten mixture rapidly adjusts to equilibrium composition in the chamber 11 by evaporation of trichloride from the mixture or absorption of trichloride from the gas flow, and thereafter remains effectively saturated with aluminum trichloride (since no trichloride is added to or removed from the mixture at any locality external to the chamber)

at the temperature of the molten salt and the pressure in the chamber, the particular proportion of aluminum trichloride present in the molten mixture being determined by such temperature and pressure conditions. Thus the aluminum trichloride gas flowing through the chamber is maintained continuously in gaseous state; i.e. the gas flow is neither augmented nor diminished in the chamber, and there is no significant contamination of the gas flow in the chamber by volatilization of molten salt constituents. Under certain conditions some volatilization of sodium chloride from the mixture may occur and may have some limited effect in increasing heat requirements elsewhere in the system, but is not otherwise harmful in the subhalide distillation system.

The flow of gas is cooled in the chamber, from its initial or inlet temperature to a desired lower outlet temperature (at which it leaves the chamber through outlet 17), by the extended heat-exchange contact with the splashed molten salt. The heat transferred from the gas to the salt is in turn transferred to the water in heat exchanger 24 upon circulation of the salt through coil 25, so that the salt in the chamber 11 is maintained at a temperature for cooling the gas from the first to the second of the above-mentioned temperatures; this transferred heat, as stated, boils the water in the heat exchanger. The body of the water in the heat exchanger may be maintained under somewhat elevated pressure, e.g. so as to boil at a temperature of about 135° C.

If solid or liquid aerosol material is entrained in the gas flow entering the condenser 10, the contact with the molten salt effected in the condenser removes the entrained solid or liquid, which is then carried with the molten salt in the cooling circuit. To prevent excessive accumulation of the material in the molten salt, all or part of the circulating salt may be passed through separating means (shown as a separator 33 connected in the external molten salt circuit by conduits 34a and 34b controlled by a valve 35) which separates out and removes the solid or liquid material from the molten salt. When the latter material is a particulate solid, the separator 33 may comprise a suitable filter through which the particle-containing molten salt is passed; if the material is a liquid, such as droplets of aluminum metal fog, the separator 33 may be arranged to provide a settling chamber wherein the aluminum, as molten metal, separates out from the molten salt which (e.g. in the case of use of an aluminum trichloride-sodium chloride melt) has a lower specific gravity than molten aluminum. When the separator employed is of a type having a high flow resistance, such as a filter, it is desirable to provide a second valve 35a in line 23 between the two points where the separator circuit joins line 23; alternatively, the flow through the separator circuit may be controlled by means of a single valve (i.e. the valve 35a) positioned at the latter locality in line 23, valve 35 being omitted.

Thus, in short, the method of the invention as described above is effective not only to reduce the temperature of the gas flow but also to scrub the gas and thereby to remove entrained solid or liquid material therefrom. If desired, the method may be performed in the illustrated splash condenser to effect scrubbing without cooling, the heat exchanger 24 being omitted and the molten salt thus being permitted to come up to and remain at the temperature of the gas.

By way of specific illustration of the described method as performed in the apparatus of FIG. 1, in a system cooling 1500 lb./hr. of aluminum trichloride gas from 500° C. to 200° C. at a pressure of one atmosphere by splash contact of the gas with a molten mixture of sodium chloride and aluminum trichloride, the salt composition is maintained at 71 mol percent aluminum trichloride and 29 mol percent sodium chloride by applying cooling of approximately 50 kilowatts to the molten salt.

Approximate salt compositions for other conditions of operation using a sodium chloride-aluminum trichloride melt in a splash condenser of the type illustrated are set forth in the following table:

| Gas Outlet Temp., ° C. | Pressure | Salt Composition, mol Percent | |
|---|---|---|---|
| | | AlCl₃ | NaCl |
| 400 | 1 atm. | 59 | 41 |
| 300 | 100 mm. Hg | 56 | 44 |
| 200 | 15 mm. Hg | 56 | 44 |

Referring now to FIGS. 2 and 3, there is shown an alternative form of apparatus for performing the method of the present invention to effect heating of a flow of aluminum trichloride gas. This apparatus includes a splash condenser 36 generally arranged as described in the copending application of Norman W. F. Phillips, Bryan Rapson and Frederick William Southam, Ser. No. 407,760, filed Oct. 30, 1964. Thus, the illustrated condenser 36 comprises an axially horizontal, elongated and generally cylindrical unlined steel vessel 37 defining an internal chamber 38 which is separated into a first contact zone 39, a second contact zone 40 and a gas-disengaging zone 41 by spaced baffles 43 and 44 which extend across the chamber perpendicular to the chamber axis. The chamber is adapted to be partly filled to a level 46 therein with a body of molten salt 47 which may again, for example, be a molten mixture of aluminum trichloride and sodium chloride. Openings 48 and 49 are provided in the baffles 43 and 44 below the molten salt level 46 to permit flow of molten salt throughout chamber 38 and corresponding openings 50 and 51 are provided in the baffles above the level 46 for flow of gas through the chamber i.e. successively through the first and second contact zones and the gas disengaging zone, from a gas inlet 53 which opens into the first contact zone 39, to a gas outlet 54 which opens into the gas disengaging zone 41.

In the contact zones 39 and 40, adjacent the baffles 43 and 44 respectively and positioned to one side of the respective gas openings 50 and 51 of the baffles are disposed first and second axially vertical screw lifts 57 and 58. Each of these screw lifts extends downwardly into the body of molten salt 47 and bears on its external surface a pair of upwardly opening helical channels. In operation, these screw lifts are rotated by suitable means (not shown); as the screw lifts rotate, molten salt is raised up from the body 47 in the helical channels and thrown off by centrifugal force through the upper (gas flow) regions of the respective contact zones 39 and 40, as a spray of molten salt. A semi-circular shroud or baffle 60 is positioned in closely adjacent relation to the screw lift 57 for cooperation therewith in directing the spray of molten salt through a desired range of directions in the first contact zone 39 (as indicated by broken arrows in FIG. 3) and a corresponding semi-circular shroud or baffle 61 is disposed in closely adjacent relation to the second screw lift 58 to provide the same effect in the contact zone 40.

Thus, in this arrangement of elements, the flow of gas (i.e. consisting essentially of aluminum trichloride) to be heated enters the condenser 36 through the inlet 53 and successively traverses the first and second contact zones 39 and 40 in exposure to the splashed molten salt thrown out by the rotary screw lifts 57 and 58, before leaving the chamber 38 through gas outlet 54. The extended, intimate gas-liquid contact thus provided effects heat exchange between the molten salt and the gas, in this case elevating the temperature of the gas, the molten salt being maintained at a desired temperature higher than that at which the gas enters chamber 38. To maintain the molten salt at the latter temperature, the salt is continuously heated, for example (as shown in FIG. 3) by circulating the molten salt with a suitable pump 64 through an external oil-fired heater 65, the salt flow being controlled by a valve 66. Other heating means may be employed if desired; for example, the molten salt may be heated by internal electrical resistance heating by immersing a plurality of spaced electrodes (not shown) in the body 47 within the condenser 36 and passing alternating electric current between these electrodes through the molten salt; in the latter case it is of course necessary to provide an electrically insulating internal lining for the condenser structure 36 to prevent short-circuiting.

In the described operation, the molten salt is, again, initially provided at approximately the correct proportionate composition for equilibrium under the temperature and pressure conditions obtaining in the condenser and is then permitted to come to the equilibrium composition by initial absorption or evaporation of trichloride. Since, as stated, the equilibrium proportion of aluminum trichloride in a molten mixture as described decreases with increasing temperature for given pressure conditions, the heating of the molten salt (where performed at a locality external to the chamber 38) would result in evaporation of aluminum trichloride at such locality, reducing the trichloride content of the melt before return thereof to the chamber 38, if the conditions of pressure in the heater corresponded to those in the latter chamber; then upon cooling of the trichloride-lean melt in the chamber 38 by heat-exchange contact with the gas, the melt would absorb further quantities of trichloride from the gas so that there would be a continuing, undesired depletion of the gas flow under treatment. Accordingly, for this instance of operation, the heater is maintained at an elevated pressure to prevent evaporation of trichloride as the molten salt is heated, and the heated salt is then returned to the chamber 38 under such elevated pressure, so that as returned to the chamber it is effectively saturated with aluminum trichloride.

As a specific example illustrating the performance of the present method for heating a flow of aluminum trichloride gas, 20,000 lb./hr. of aluminum trichloride gas are heated from 200° C. to 500° C. in a condenser of the type illustrated in FIGS. 2–3, comprising an unlined steel shell (with external thermal insulation) 3 feet in diameter and filled to the center line with a molten mixture of sodium chloride and aluminum trichloride and having two contact zones each 5 feet long followed by a one-foot-long gas disengaging zone. In this apparatus the screw lifts are 8 inches in diameter and are rotated at approximately 700 r.p.m.; the shrouds are placed 0.5 inch from the screw lifts and oriented to direct the salt spray countercurrent to the gas. Openings 12 inches high and 6 inches wide in the baffles behind the screw lifts permit gas to pass through the successive zones of the chamber and similar openings below the melt level permit flow of molten salt countercurrent to the gas.

In the described operation, as stated, 20,000 lb./hr. of gas consisting essentially of aluminum trichloride are introduced to the condenser at a temperature of 200° C., and 20,000 lb./hr. of trichloride gas are discharged from the condenser at a temperature of 500° C., the gas being heated in the contact zones of the condenser by heat-exchange contact with the spray of molten salt mixture therein. The latter mixture, which contains 57 mole percent $AlCl_3$, is passed through the condenser counter-current to the gas flow at a rate of 610,000 lb./hr., being introduced at a temperature of 550° C. and withdrawn at 450° C. The melt is heated in an oil-fired external heating system, heating requirements for the melt (including losses) being about 750 kw. In the external heating circuit, the mixture is pressurized to approximately 15 p.s.i. (gauge) to prevent evaporation in the heater.

It is to be understood that the invention is not limited to the procedures and embodiments hereinabove specifically set forth but may be carried out in other ways without departure from its spirit.

We claim:

1. A method of treating a flow of gas consisting essentially of aluminum normal halide and aerosol impurities, comprising advancing said flow of gas continuously into, through, and out of a confined region while maintaining said normal halide continuously in gaseous state to recover said impurities, and in said confined region bringing said flow of gas into extended surface contact with a molten salt, said molten salt being substantially non-volatile and non-absorptive to said aluminum normal halide in said confined region, and controlling the concentration of aluminum normal halide in said molten salt to inhibit removal of aluminum normal halide from the gas.

2. A method of altering the temperature of a flow of gas consisting essentially of aluminum normal halide and aerosol impurities from a first value to a second value, comprising advancing said flow of gas continuously into, through, and out of a confined region while maintaining said normal halide continuously in gaseous state to recover said impurities, and in said confined region bringing said flow of gas into extended surface contact with a molten salt to effect heat exchange between said gas and said molten salt, said molten salt in said confined region being at a temperature for altering the gas flow temperature from said first value to said second value, said molten salt further being substantially non-volatile and non-absorptive to said aluminum normal halide in said confined region, and controlling the concentration of aluminum normal halide in said molten salt to inhibit removal of aluminum normal halide from the gas.

3. A method of cooling a flow of gas consisting essentially of aluminum normal halide and aerosol impurities from a first temperature to a second, lower temperature, comprising advancing said flow of gas continuously into, through, and out of a confined region while maintaining said normal halide continuously in gaseous state to recover said impurities, and at a first locality which is within said confined region bringing said flow of gas into extended surface contact with a molten salt to effect transfer of heat from said gas to said molten salt, while continuously circulating said molten salt between said first locality and a second locality and removing heat from said molten salt at said second locality to provide said salt at said first locality at a temperature for cooling the gas flow to said second temperature, said molten salt comprising a mixture of said aluminum normal halide and other halide selected from the class consisting of alkali metal halides and alkaline earth metal halides of the same halogen as said aluminum normal halide, said mixture being substantially non-volatile and effectively saturated with said aluminum normal halide in said confined region.

4. A method of cooling a flow of gas consisting essentially of aluminum normal halide and aerosol impurities from a first temperature to a second, lower temperature, comprising establishing a body of a molten salt mixture containing said aluminum normal halide as a constituent thereof in a confined region, advancing said flow of gas continuously into, through, and out of said confined region while maintaining said normal halide of said gas flow continuously in gaseous state to recover said impurities, and in said confined region splashing said body of molten salt mixture in the path of advance of said flow of gas thereby to bring said flow of gas into extended surface contact with the splashed molten salt to effect transfer of heat from said gas to said molten salt, while removing heat from said molten salt body to provide said salt mixture in said confined region at a temperature for cooling the flow of gas from said first temperature to said second temperature, said molten salt being substantially non-volatile and effectively saturated with said aluminum normal halide in said confined region.

5. A method of cooling a flow of gas consisting essentially of aluminum normal halide from a first temperature to a second, lower temperature, while removing from said flow of gas aerosol material entrained therein, comprising advancing said flow of gas continuously into, through, and out of a confined region while maintaining said normal halide continuously in gaseous state, and at a first locality which is within said confined region bringing said flow of gas into extended surface contact with a molten salt mixture containing said aluminum normal halide as a constituent thereof, to effect transfer of heat from said gas to said molten salt mixture, and concomitantly to scrub said gas with said molten salt mixture for effecting transfer of said aerosol material from said gas to said molten salt, while circulating said molten salt mixture from said first locality to a second locality and separating said aerosol material from said molten salt at said second locality, said molten salt in said confined region being at a temperature for cooling the flow of gas from said first temperature to said second temperature, said molten salt further being substantially non-volatile and effectively saturated with said aluminum normal halide in said confined region.

6. A method of cooling a flow of gas consisting essentially of aluminum trichloride from a first temperature to a second, lower temperature, while removing from said flow of gas aerosol material entrained therein, comprising establishing in a confined region a body of a molten salt mixture of aluminum trichloride and sodium chloride, advancing said flow of gas continuously into, through, and out of said confined region while maintaining said aluminum trichloride of said gas flow continuously in gaseous state, splashing said body of molten mixture through said confined region in the path of advance of said flow of gas to bring said flow of gas into extended surface contact with said molten salt mixture thereby to effect transfer of heat from said gas to said molten mixture and concomitantly to scrub said gas with said molten mixture for effecting transfer of said aerosol material from said gas to said molten salt, while continuously circulating a flow of said molten mixture between said body in said confined region and a locality external thereto along a closed path, and while transferring heat from said molten mixture to an external heat exchange medium at said external locality to provide said body in said confined region at a temperature for cooling the flow of gas from said first temperature to said second temperature and separating said aerosol material from said molten mixture while conducting said molten mixture through said closed path, said molten mixture being substantially non-volatile and effectively saturated with aluminum trichloride in said confined region.

7. A method of heating a flow of gas consisting essentially of aluminum normal halide and aerosol impurities from a first temperature to a second, higher temperature, comprising advancing said flow of gas continuously into, through, and out of a confined region while maintaining said normal halide continuously in gaseous state to recover said impurities, and in said confined region bringing said flow of gas into extended surface contact with a molten salt to effect transfer of heat to said gas from said molten salt while supplying heat to said molten salt in said confined region to provide said molten salt therein at a temperature for heating the flow of gas from said first temperature to said second temperature, said molten salt being substantially non-volatile and non-absorptive to said aluminum normal halide in said confined region, and controlling the concentration of aluminum normal halide in said molten salt to inhibit removal of aluminum normal halide from the gas.

8. A method of heating a flow of gas consisting essentially of aluminum trichloride and aerosol impurities from a first temperature to a second, higher temperature, comprising advancing said flow of gas continuously into, through, and out of a confined region while maintaining said aluminum trichloride continuously in gaseous state to recover said impurities, and in said confined region bringing said flow of gas into extended surface contact with a molten salt mixture containing aluminum trichloride as a constituent thereof to effect transfer of heat from said molten mixture to said flow of gas, while continuously circulating said molten mixture along a closed path between said confined region and a locality external thereto, and supplying heat to said molten mixture at said external locality to provide said molten mixture in said confined region at a temperature for heating the flow of gas from said first temperature to said second temperature, while maintaining said molten mixture in said external locality under pressure sufficient to prevent evaporation of aluminum trichloride from said molten mixture at said external locality, said molten salt being substantially non-volatile and effectively saturated with aluminum trichloride in said confined region.

9. A method of scrubbing a flow of gas consisting essentially of aluminum normal halide to remove from said flow of gas aerosol material entrained therein, comprising advancing said flow of gas continuously into, through, and out of a confined region while maintaining said normal halide continuously in gaseous state, and at a first locality which is within said confined region bringing said flow of gas into extended surface contact with a molten salt to effect transfer of said aerosol material from said gas to said molten salt, while circulating said molten salt from said first locality to a second locality and separating said aerosol material from said molten salt at said second locality, said molten salt being substantially non-volatile and non-absorptive to said aluminum normal halide in said confined region.

10. A method of scrubbing a flow of gas consisting essentially of aluminum trichloride to remove from said flow of gas aerosol material entrained therein, comprising establishing a body of a molten salt mixture including aluminum trichloride as a constituent thereof in a confined region, advancing said flow of gas continuously into, through, and out of said confined region while maintaining the aluminum trichloride of said gas flow continuously in gaseous state, and splashing said body of molten salt mixture through said confined region in the path of advance of said flow of gas to bring said flow of gas into extended surface contact with said molten mixture thereby to effect transfer of said aerosol material from said gas to said molten mixture, while circulating said molten mixture from said confined region to a locality external thereto and separating said aerosol material from said molten mixture at said external locality, said molten salt being substantially non-volatile and effectively saturated with aluminum trichloride in said confined region.

References Cited

UNITED STATES PATENTS

| | | | |
|---|---|---|---|
| 2,387,228 | 10/1945 | Arnold | 23—93 |
| 3,078,145 | 2/1963 | Gayol | 23—93 |
| 3,152,864 | 10/1964 | Derham | 23—93 |
| 3,235,376 | 2/1966 | Hollingshead | 75—68 |

REUBEN FRIEDMAN, *Primary Examiner.*

C. HART, *Assistant Examiner.*